Sept. 28, 1948.  F. D. BOSTWICK  2,450,107
MIXING VESSEL AND DEFLECTOR THEREFOR
Filed May 21, 1945  3 Sheets-Sheet 2
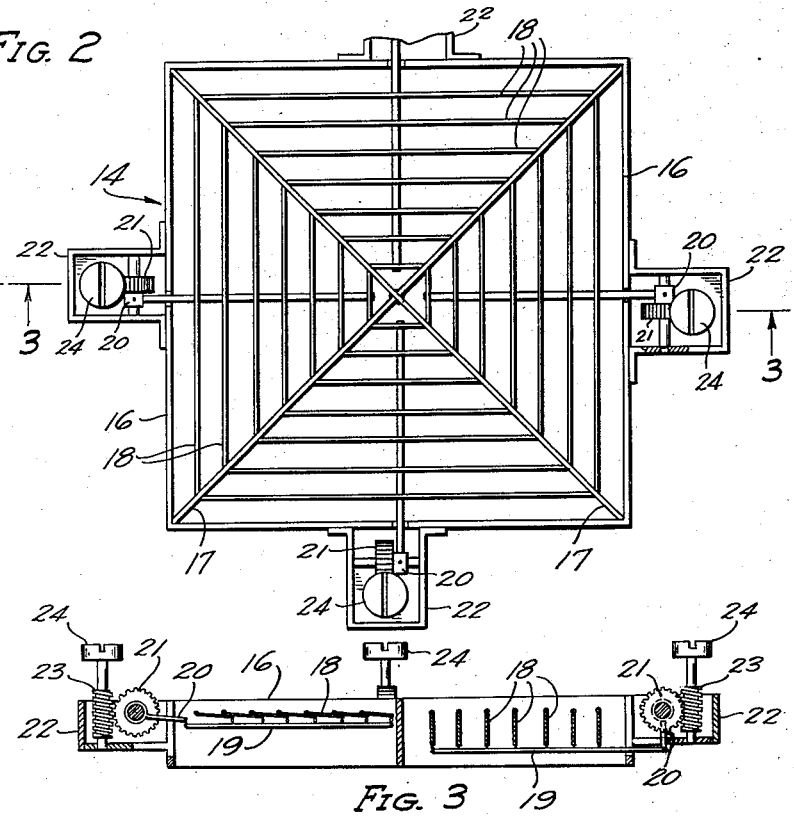
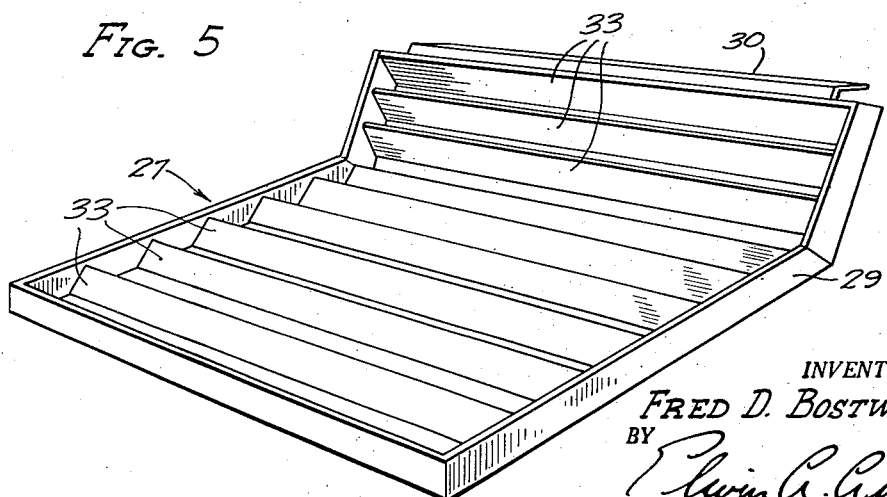
INVENTOR.
FRED D. BOSTWICK
BY
Attorney

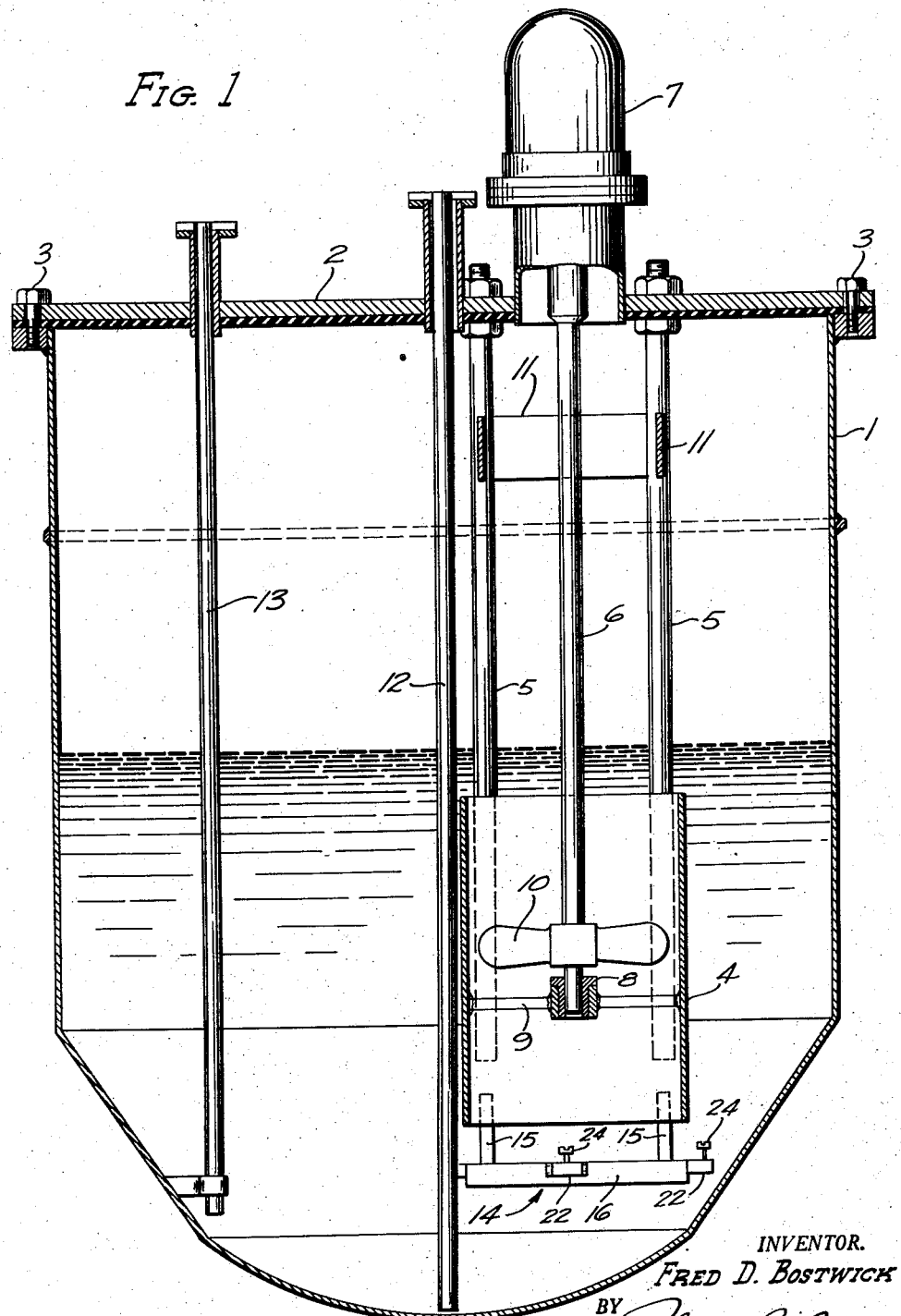

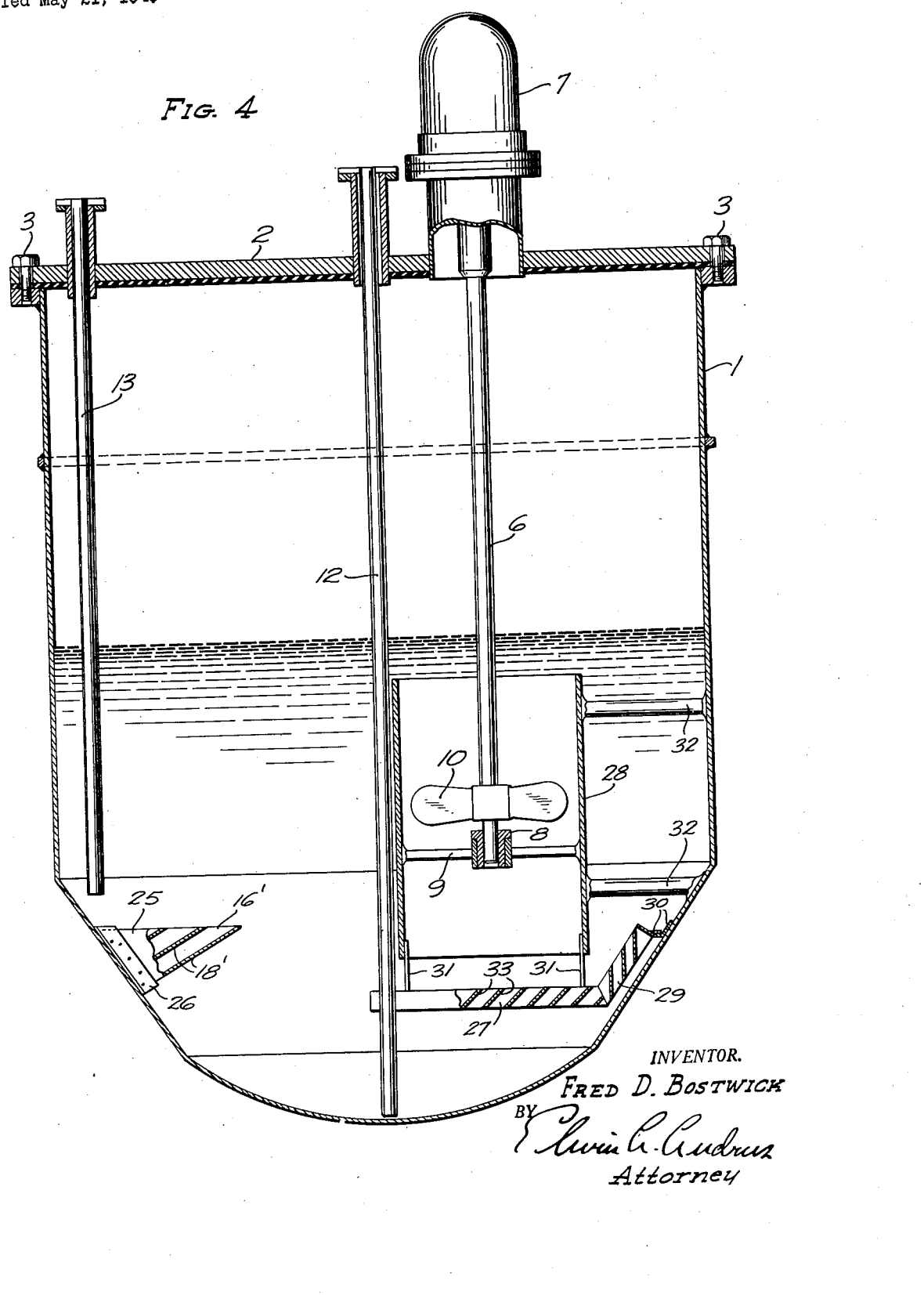

Patented Sept. 28, 1948

2,450,107

UNITED STATES PATENT OFFICE 2,450,107

MIXING VESSEL AND DEFLECTOR THEREFOR

Fred D. Bostwick, Thiensville, Wis., assignor to A. O. Smith Corporation, Milwaukee, Wis., a corporation of New York Application May 21, 1945, Serial No. 594,965

4 Claims. (Cl. 259—97)

This invention relates to a mixing vessel and deflector for mixing and agitating fluids, and has particular reference to a deflector that is used as a pressure and flow deflector as well as a wear plate to protect the wall of the receptacle or vessel.

In mixing and agitating binary combinations of matter, the matter churned by the stirrer or agitator is caused to cavitate with a resulting loss of efficiency in accomplishing a proper mixing. This is especially true if solids are present in the matter being mixed and where propeller, impeller and turbine type of equipment is employed.

The principal object of the invention is to provide a mixing vessel with a deflector that interrupts and destroys cavitation and thereby improves the efficiency of mixing the binary contents of the receptacle in which the deflector is used.

Another object is to provide a deflector that breaks up the solids and semi-solids in the matter being mixed and which distributes and divides any gas included therein and mixes the liquids and gas.

A further object is to provide a deflector which is adjustable to permit changing the angle of flow of material thereagainst.

Another object is to provide a deflector that is readily removable from a receptacle and which can be easily employed in a number of different receptacles.

A further object is to provide a deflector that can be made to fit at substantially any position in a mixing tank.

Another object is to provide a deflector that will enhance the scrubbing action in mixing gases and liquids.

Another object is to provide a deflector that will equalize flow in substantially all directions.

Another object is to provide a deflector that serves as a wear plate in deflecting material being mixed to prevent washing off of a protective coating such as the products of corrosion normally adhering to the shell of the vessel.

Other objects and advantages of the invention will appear hereinafter.

The accompanying drawings illustrate several embodiments of the invention and the views of the drawings are as follows:

Figure 1 is a vertical sectional view of a mixing and agitating receptacle with the deflector disposed therein;

Fig. 2 is a top plan view of the deflector of Figure 1 removed from the receptacle;

Fig. 3 is a sectional view taken on line 3—3 of Fig. 2 and showing the adjustment of the louvers;

Fig. 4 is a vertical sectional view of a vessel similar to Figure 1 showing several deflectors secured to the vessel shell; and Fig. 5 is a perspective view of the deflector at the right hand side of the vessel of Fig. 4.

The mixing and agitating receptacle or vessel comprises a generally cylindrical shell 1 with the bottom end thereof curved and formed closed, the upper end being closed by the removable cover 2. The bolts 3 secure the cover 2 to a flange at the top end portion of shell 1 to enable ready removal of the cover.

A draft tube 4 is supported within the shell 1 by a plurality of depending columns 5, the lower ends of which are secured to the draft tube 4 while the upper ends thereof extend through the cover 2 and are bolted thereto. The draft tube is shown as located to one side of the vessel; it might however be located in the center of the vessel or at any other position therein.

A propeller shaft 6 extends through a suitable bearing opening in the cover 2 in line with the center of draft tube 4. The outer end of propeller shaft 6 is suitably connected to a motor unit 7 disposed above the cover 2 and provided to rotate shaft 6.

The inner end of shaft 6 extends a substantial distance within the draft tube 4 and is journaled for rotation in the bearing 8. The bearing 8 is supported against the wall of the tube 4 by the rods 9 extending radially between the tube wall and the bearing and suitably secured to the same.

An agitating screw or propeller 10 is secured to the shaft 6 at a line slightly upwardly removed from the bearing 8 and has dimensions to permit rotation thereof within the draft tube 4 when shaft 6 is rotated by the motor unit 7.

The columns 5 supporting the draft tube 4 may additionally be supported within the vessel adjacent the upper end portion by the gusset plates 11.

The agitating receptacle may also be provided with a dip pipe 12 which extends through a bearing opening in the cover 2 and is employed in removal of the contents of the vessel. A thermostatic unit 13 may also be provided.

Both ends of tube 4 are below the liquid level in the vessel and the propeller 10 by rotating is adapted to circulate liquid preferably downwardly through the tube.

Figure 1 illustrates a deflector 14 spaced from the bottom end of the draft tube 4 and secured thereto by a plurality of straps 15 extending between the deflector and tube. Fig. 2 is a top plan view of the deflector 14 removed from the mixing receptacle.

The deflector 14 comprises a square-shaped frame 16 provided with a pair of diagonal cross pieces 17 that divide the deflector into four triangular-shaped segments. The deflector may be of any shape such as square, oblong, round or elliptical and the frame 16 thereof may be distorted to accommodate space and application or both. The cross pieces 17 may be entirely eliminated.

In the deflector illustrated, a plurality of louvers or vanes 18 or the like of different lengths extend between the diagonal pieces 17 at spaced locations and the ends of the louvers are journaled in suitable bearings in the pieces 17. The louvers 18 may be secured within the deflector at a fixed angle of deflection. However, if the louvers are journaled in the pieces 17 as described they may be adjusted to change the angle of deflection of the contents of the receptacle or be completely closed to prevent flow of the vessel contents within a given area.

The louvers 18 are adjusted by any suitable device. The device illustrated comprises a rod 19 which is hinged to each louver located in a respective segment and extends from the longest louver adjacent the frame 16 of the deflector to the shortest louver adjacent the intersection of the diagonal cross pieces 17.

The outer end of rod 19 is connected by the crank 20 to the gear 21 which rotates on a shaft disposed within the bracket 22 secured to the frame 16. Gear 21 meshes with the vertical worm gear 23 and the latter is rotated by handle 24 to open and close the louvers. The top of handle 24 is provided with a transverse groove so that the same may be turned by working through the top of the vessel with an appropriate tool to adjust the louvers to the angle desired.

Each segment of the deflector is provided with the rod, gears and handle described so that the louvers of each segment may be separately operated. In the illustration of the deflector the louvers 18 of each segment of the deflector 14 are disposed at different angles. The angles of the louvers of each segment may be the same to equalize the flow of the contents of the vessel in all directions or the angles of deflection may be different if desired.

It will ordinarily be desirable to locate the louvers at an angle so that matter being mixed or agitated by the propeller 10 and driven through the deflector is directed away from direct impact with the shell 1 of the receptacle. In this manner the deflector 14 not only assists in breaking up the matter being mixed but also controls the flow thereof to operate as a wear plate in preventing the vessel contents from being driven directly against the shell 1. The protective coating of corrosion products normally adhering to the shell is not washed off and remains to prevent corrosion thereof.

With the construction illustrated in Figure 1 the bolts 3 securing the cover 2 to the shell 1 may be removed to enable the cover to be lifted and the entire mixing apparatus located within the vessel to be readily removed, including the deflector 14, the draft tube 4, the propeller 10 and the drive shaft 6 for cleaning or use in another receptacle. The dip pipe 12 and thermostatic unit 13 are also removed when the cover 2 is lifted from the shell 1.

Figure 4 illustrates several other types of deflectors that may be secured within a mixing and agitating receptacle. The deflector of the invention may be employed with or without a draft tube. The deflector 25 located at the left-hand side of the vessel and secured to the shell 1 in general is similar to the deflector 14 except that the frame 16' is angular and the louvers 18' are fixed within the frame at a predetermined angle. Although the deflector 25 may be fixed to the vessel wall it is shown as held by the bracket 26 which is attached to the vessel wall. This permits the deflector 25 to be readily removed.

The deflector 27 disposed at the right hand side of the receptacle at a spaced location beneath the draft tube 28 illustrates a deflector in which the frame 29 is turned diagonally upwardly at the outer end thereof. The deflector 27 is secured to the shell 1 by the brackets 30 and is also attached to the draft tube 28 by the straps 31. The tube 28 here is secured to the shell wall by a plurality of tubes 32. Neither the draft tube 28 nor the deflector 27 is removable.

The louvers 33 of the deflector 27 are located within the frame 29 at a predetermined fixed angle. However, the louvers 33 may be adjustable to different angles by an operating device similar to the embodiment illustrated in Figures 1 and 2.

The deflector of the invention illustrated in the several embodiments shown and described substantially enhances mixing and agitating operations by intercepting and interrupting cavitation by the matter being mixed in the receptacle. The louvers break up solids and semi-solids and at the same time the deflector acts as a wear plate in directing the contents being mixed away from the shell.

With the deflector 14 illustrated in Figures 1 and 2 no heat is lost through the deflector by transfer to the shell of the vessel and the deflector is readily removed from the vessel. A single deflector may be employed in a mixing receptacle or a number may be employed to interrupt cavitation and effect an efficient mixing of the contents. The deflector finds particular importance when abrasive material is being melted or dissolved under the influence of agitation and cooking.

Various embodiments of the invention may be employed within the scope of the accompanying claims.

I claim:

1. In a vessel for mixing and agitating materials, means to stir the contents of the vessel, and a deflector disposed in the flow stream of the materials and comprising a frame formed of four outer members joined together and a pair of cross pieces extending diagonally from opposite corners of said frame and intersecting centrally of the frame, a plurality of louvers spaced apart and extending between said cross pieces to divide the deflector into four triangular segments, and means secured to the louvers of each segment to locate the louvers at various predetermined angles of deflection.

2. In a receptacle for mixing binary combinations of matter having a generally thin shell closed at the bottom and closed at the top by a removable cover, a draft tube disposed within said vessel beneath the level of material to be mixed therein and suspended from said cover by a plurality of support members, a propeller member disposed for rotation in said draft tube, a shaft having one end portion secured to said propeller and the other end portion extending through said cover and secured for rotation therein, a motor disposed above said cover to drive said shaft and propeller, and a deflector suspended from said draft tube and spaced axially from the bottom of the draft tube and also from the shell of the receptacle, said deflector having a plurality of louvers disposed at predetermined angles of deflection to interrupt the axial flow of the contents of the receptacle therethrough by the propeller and prevent direct impact of the contents with the shell of said receptacle.

3. In a receptacle for mixing binary combinations of matter having a generally thin shell formed closed at the bottom and closed at the top by a removable cover, a draft tube disposed within said vessel beneath the level of the materials therein and suspended from said cover by a plurality of support members, a propeller member disposed for rotation in said draft tube, a shaft having one end portion secured to said propeller and the other end portion extending through said cover and secured for rotation therein, a motor disposed above said cover to drive said shaft and propeller, a deflector spaced axially from the bottom of said draft tube and secured thereto, and means to secure said draft tube and deflector to the receptacle shell in spaced relation thereto, said deflector having a frame with an outer portion turned diagonally upwardly complementary to the curvature of the shell of the receptacle and a plurality of louvers disposed therebetween and attached thereto in flow deflecting position to interrupt the flow of the contents of said tank driven axially therethrough by said impeller, and thereby deflect the contents away from direct impact with the shell of the receptacle.

4. In a receptacle for mixing and agitating binary combinations of matter having a draft tube spaced from the wall of the receptacle with a propeller supported for rotation therein to direct the matter being mixed in a flow stream through the draft tube and throughout the receptacle, a deflector disposed slightly outwardly axially from the exit of said draft tube and spaced from the wall of said receptacle, said deflector comprising a plurality of louvers secured in spaced relation to each other and mounted for adjustment in angular flow deflecting position to change the direction of flow of the fluid discharged from the draft tube into an angular flow gradually directed away from the wall of the receptacle.

FRED D. BOSTWICK.

REFERENCES CITED

The following references are of record in the file of this patent:

UNITED STATES PATENTS

| Number | Name | Date |
| --- | --- | --- |
| 162,560 | Jincks | Apr. 27, 1875 |
| 614,522 | Whiting et al. | Nov. 22, 1898 |
| 1,351,352 | Stevens | Aug. 31, 1920 |
| 1,673,594 | Schmidt | June 12, 1928 |
| 1,720,549 | Gilchrist | July 9, 1929 |
| 1,891,122 | Urch | Dec. 13, 1932 |
| 2,201,212 | Valentine | May 21, 1940 |